US008250330B2

(12) United States Patent
Lais et al.

(10) Patent No.: US 8,250,330 B2
(45) Date of Patent: Aug. 21, 2012

(54) MEMORY CONTROLLER HAVING TABLES MAPPING MEMORY ADDRESSES TO MEMORY MODULES

(75) Inventors: Eric N. Lais, Tillson, NY (US); Donald R. DeSota, Portland, OR (US); Michael Grassi, Shokan, NY (US); Bruce M. Gilbert, Beaverton, OR (US)

(73) Assignee: International Business Machines Corporation, Armonk, NY (US)

( * ) Notice: Subject to any disclaimer, the term of this patent is extended or adjusted under 35 U.S.C. 154(b) by 1133 days.

(21) Appl. No.: 11/010,205

(22) Filed: Dec. 11, 2004

(65) Prior Publication Data

US 2006/0129739 A1  Jun. 15, 2006

(51) Int. Cl.
  G06F 12/00  (2006.01)
  G06F 13/00  (2006.01)
  G06F 13/28  (2006.01)
  G06F 12/06  (2006.01)
  G06F 9/26  (2006.01)
  G06F 9/34  (2006.01)
  G11C 8/00  (2006.01)

(52) U.S. Cl. .............. 711/202; 365/230.05; 711/205; 711/206; 711/207; 711/5; 711/168; 711/221; 711/170

(58) Field of Classification Search .................. 711/105, 711/202
  See application file for complete search history.

(56) References Cited

U.S. PATENT DOCUMENTS

| | | | | |
|---|---|---|---|---|
| 5,227,863 A | * | 7/1993 | Bilbrey et al. | 348/578 |
| 5,586,300 A | * | 12/1996 | Wilcox et al. | 711/150 |
| 5,633,999 A | * | 5/1997 | Clowes et al. | 714/6 |
| 5,761,695 A | * | 6/1998 | Maeda et al. | 711/5 |
| 6,684,292 B2 | | 1/2004 | Piccirillo et al. | |
| 2002/0147898 A1 | * | 10/2002 | Rentschler et al. | 711/170 |
| 2003/0056061 A1 | | 3/2003 | Sherman | |
| 2003/0101314 A1 | | 5/2003 | Piccirillo et al. | |
| 2003/0158884 A1 | | 8/2003 | Alford, Jr. | |
| 2004/0006674 A1 | * | 1/2004 | Hargis et al. | 711/156 |
| 2005/0071521 A1 | * | 3/2005 | Nordstrom et al. | 710/9 |

OTHER PUBLICATIONS

RAID-II: Design and Implementation of a Large Scale Disk Array Controller1 R. H. Katz et al. Mar. 1993.*
Evidentiary reference wikipedia : page table p. 1 Mar. 2008.*

* cited by examiner

Primary Examiner — Yaima Campos
Assistant Examiner — Marwan Ayash
(74) Attorney, Agent, or Firm — Steven L. Bennett

(57) ABSTRACT

A memory controller includes ports and corresponding tables. Each port is receptive to one or more memory modules. Each table includes entries mapping memory addresses to the memory modules. Each entry corresponds to no more than one of the memory modules. The tables support asymmetric population of the memory modules within the ports; each port is capable of having a different number of memory modules relative to the other ports. The tables impose no restrictions on where the memory modules are to be inserted within the ports, both number-wise and position-wise. The tables are independently configurable; the configuration of each table is modifiable independently of the configurations of the other tables. Each table is dynamically configurable. The entries of a table are modifiable to reflect changes in the number and type of the memory modules connected, without restarting or temporarily halting the computer system containing the memory controller.

5 Claims, 5 Drawing Sheets

FIG. 2

| ADDRESS | MODULE |
|---|---|
| 100 | MOD 1 (108A) |
| EMPTY | EMPTY |
| 101 | MOD 3 (108C) |
| 110 | MOD 4 (108D) |
| 111 | MOD 2 (108B) |

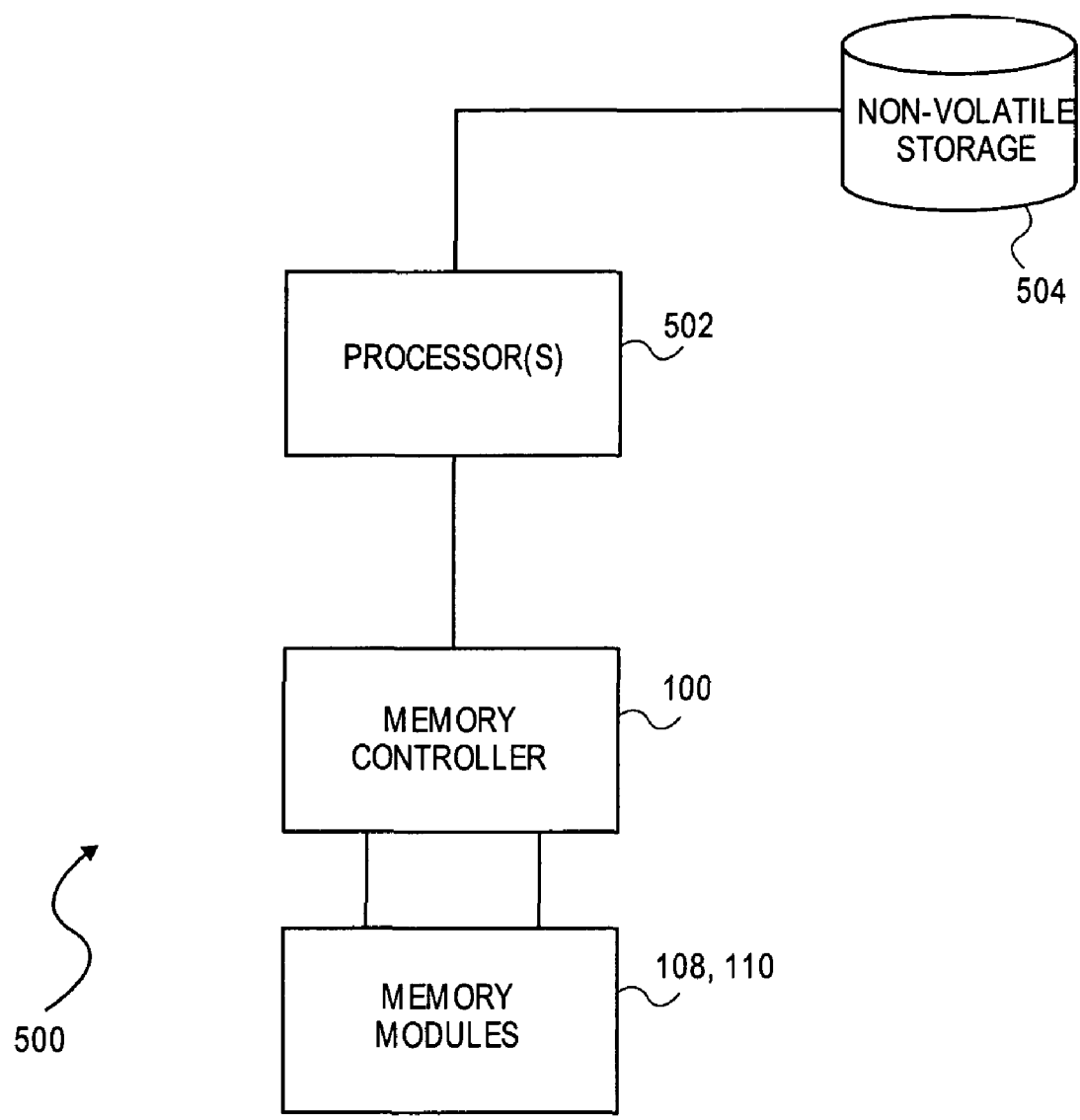

MEMORY CONTROLLER HAVING TABLES MAPPING MEMORY ADDRESSES TO MEMORY MODULES

FIELD OF THE INVENTION

The present invention relates generally to memory controllers, and more particularly to memory controllers with tables having entries mapping memory addresses to memory modules.

BACKGROUND OF THE INVENTION

A typical computer system includes a processor, a non-volatile storage device like a hard disk drive, and volatile storage, usually referred to as memory. The memory may be dynamic random-access memory (DRAM). Usually the memory is organized as a number of memory modules, such as single in-line memory modules (SIMM's) and dual in-line memory modules (DIMM's), among other types of memory modules.

To access the memory of a computer system, the computer system may include a memory controller. The memory controller is, a component, such as one or more integrated circuits (IC's), which interfaces directly with the memory modules of the system. All accesses to the memory modules are thus made through the memory controller.

A memory controller typically has a number of ports. Each memory module is connected to one of the ports, where each port is able to accept one or more memory modules. A port is an individual communication entity that enables access of the memory modules coupled to it independent of the memory modules coupled to the other ports.

The memory of a computer system is addressable by a number of memory addresses. One job of the memory controller is to receive a given memory address, and determine to which location of which memory module of which port the given memory address corresponds. Once this determination has been made, the contents of the memory location can be read or written as desired.

Prior art memory controllers are limited in the different physical configurations that are allowed of memory modules vis-à-vis the ports to which they are connected. For example, at least some memory controllers require symmetric population of memory modules within the ports, such that each port has an equal number of memory modules connected thereto. Other memory controllers require that the same type and/or size of memory modules populating their ports. Such restrictions limit the design choices of builders of computer systems.

Furthermore, prior art memory controllers typically do not allow for dynamic reconfiguration of the memory modules inserted into their ports. To add a memory module, to remove an existing memory module, or to move a memory module from one port to another port usually requires that the entire computer system be at best temporarily halted, and at worst shut down. For mission-critical computer systems that may need additional memory, temporarily halting or shutting down the systems to add memory can be inconvenient at best, and not allowed at worst.

The prior art limitations of the physical configurations of memory modules and the prior art inability to allow dynamic reconfiguration of memory modules are especially problematic in the context of systems having more than one partition. A partition is a separate logical entity within a computer system, which nevertheless shares resources with the other partitions of the system. Each partition may have its own memory address space that has to be mapped to the memory modules of the computer system, independently of the other partitions. The limitations of existing memory controllers described above make the allocation of the memory of a system among the different partitions a complex process. Furthermore, the inability of existing memory controllers to allow dynamic reconfiguration of memory modules can make it difficult to allow reallocation of memory among the partitions of a system, decreasing their flexibility.

Existing memory controllers may also require complex arithmetical computations to determine to which location of which memory module of which port a given memory address corresponds. Performance of these computations by the memory controllers tends to increase latency of the memory controllers, thus slowing down the performance of the entire computer systems of which they are a part. Such a reduction in performance is undesirable to builders of computer systems.

Finally, in mission-critical and other types of computer systems, redundancy within the memory is often desirable, so that the systems can continue to function if a given memory module fails. Many times the only way to achieve such redundancy is to provide redundant memory modules for all the memory modules within a system. That is, each primary memory module has a backup memory module that can act as a new primary module should the existing primary module fail. However, this type of redundancy may not be needed for all the memory modules within a system, wasting resources.

For all of these reasons, as well as other reasons, there is a need for the present invention.

SUMMARY OF THE INVENTION

A memory controller of the invention includes a number of ports and a number of tables corresponding to the ports. Each port is receptive to one or more memory modules. Each table includes a number of entries mapping memory addresses to the memory modules. Each entry of each table corresponds to no more than one of the memory modules of the table. The tables can support asymmetric population of the memory modules within the ports, in that each port is capable of having a different number of memory modules as compared to the other ports.

The tables impose no restrictions as to where and how the memory modules are to be inserted within the ports, both number-wise and position-wise. That is, the number of memory modules in each port is not restricted by the invention, nor is where those memory modules are placed in the positions or slots of the port. The tables are independently configurable, such that the configuration of each table is modifiable independently of the configurations of the other tables. Each table is also dynamically configurable. That is, the entries of a table are modifiable to reflect changes in the number and type of the memory modules connected to the port to which the table corresponds, without restarting or temporarily halting the computer system of which the memory controller is a part.

Furthermore, the entries of the table may include both read-write entries and write-only entries to provide for mirroring or redundancy of the memory modules. For example, a set of memory addresses may be mapped by a read-write entry to a first memory module, and the same set of memory addresses may be mapped by a write-only entry to a second memory module. Write-related requests to these memory addresses cause memory locations in both memory modules to be written, whereas read-related requests cause memory locations in just the first memory module to be read. The second memory module serves as a redundant or backup memory module to the first memory module. Should the first memory module fail, the second memory module can therefore take its place.

A computer system of the invention includes a number of ports, a number of memory modules, and a memory controller. One or more of the memory modules are inserted into each port. The memory controller has a number of tables corresponding to the ports. Each table includes a number of entries mapping memory addresses to the memory modules. Each entry of each table corresponds to no more than one of the memory modules. As before, the tables can impose no restrictions as to where the memory modules are inserted relative to the ports, both number-wise and position-wise.

A method of the invention determines a configuration of memory modules inserted into ports, including both the number of memory modules and the type of each memory module inserted into each port. The method sets entries of tables corresponding to the ports based on the configuration determined. Each entry of each table corresponds to no more than one of the memory modules, and maps a subset of memory addresses to one of the memory modules.

An article of manufacture includes a computer-readable medium and means in the medium. The computer-readable medium may be a recordable data storage medium, a modulated carrier signal, or another type of medium. The means is for maintaining tables corresponding to ports that are each receptive to one or more memory modules. As before, each table includes entries mapping memory addresses to the memory modules, and each entry corresponds to no more than one of the memory modules.

Embodiments of the invention provide for advantages over the prior art. First, efficient resource sharing is provided by using a memory controller with tables corresponding to ports as has been described. When the memory of a computer system is to be divided among partitions, or among different structures such as remote caches, the access to and organization of the memory can be complex. Utilizing a memory controller with tables allows for efficient resource sharing, since each port is configured using its own table, and thus is independent of the configurations of the other ports.

Second, a memory controller with tables in accordance with the invention improves memory availability and flexibility. Changes in the configurations of the memory modules inserted into the ports can be accomplished without having to restart or temporarily halt the computer system of which modules are a part. This is because the tables simply need to be modified to reflect the changes that have been made to their ports. Furthermore, tables corresponding to ports in which no changes have been made to the number and type of memory modules connected thereto may not have to be modified at all. Because the tables are independent of one another, redundant memory modules may be added to some but not all of the ports, and indeed may be added for some but not all of the other, main memory modules of a given port, and requires only minor modifications to the tables in question to reflect the added redundant modules.

Third, a memory controller with tables in accordance with the invention provides for simpler memory controller logic. Simple table look-ups are performed to determine which memory modules of which ports include the memory locations to which memory addresses correspond. Therefore, no complex arithmetical computation is needed to perform this determination. Embodiments of the invention also allow for more robust allocation of memory resources among different partitions of a computer system, since no complex computational schemes need to be devised to map the addresses spaces of the partitions to the memory modules.

Fourth, embodiments of the invention provide for dynamic scaling, allocation, and migration of memory. If memory needs to be added to a computer system, the added memory modules can be utilized immediately. The memory modules can be added to individual ports without affecting the configurations of the other ports, and the amount of memory attached to each port does not have to be uniform in size. Migrating memory from one port to another port, as well as changing the amount of memory connected to each port, thus can be accomplished with no system downtime.

Finally, embodiments of the invention allow for different sizes of memory modules to be inserted into the same or different ports of a memory controller without restriction as to where the modules have to be inserted. Different sizes and types of memory modules are supported in this way because all that is required is for the tables corresponding to the ports to be configured accordingly. Builders of computer systems are therefore provided with more flexibility in how to realize the memory requirements of different computer systems.

Still other advantages, aspects, and embodiments of the invention will become apparent by reading the detailed description that follows, and by referring to the accompanying drawings.

BRIEF DESCRIPTION OF THE DRAWINGS

The drawings referenced herein form a part of the specification. Features shown in the drawing are meant as illustrative of only some embodiments of the invention, and not of all embodiments of the invention, unless otherwise explicitly indicated, and implications to the contrary are otherwise not to be made.

FIG. 2 is diagram of a table of a memory controller in more detail, according to an embodiment of the invention.

FIG. 5 is a diagram of a rudimentary computer system including a memory controller having tables corresponding to ports thereof, according to an embodiment of the invention.

DETAILED DESCRIPTION OF THE DRAWINGS

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the present invention is defined only by the appended claims.

Figure 1:
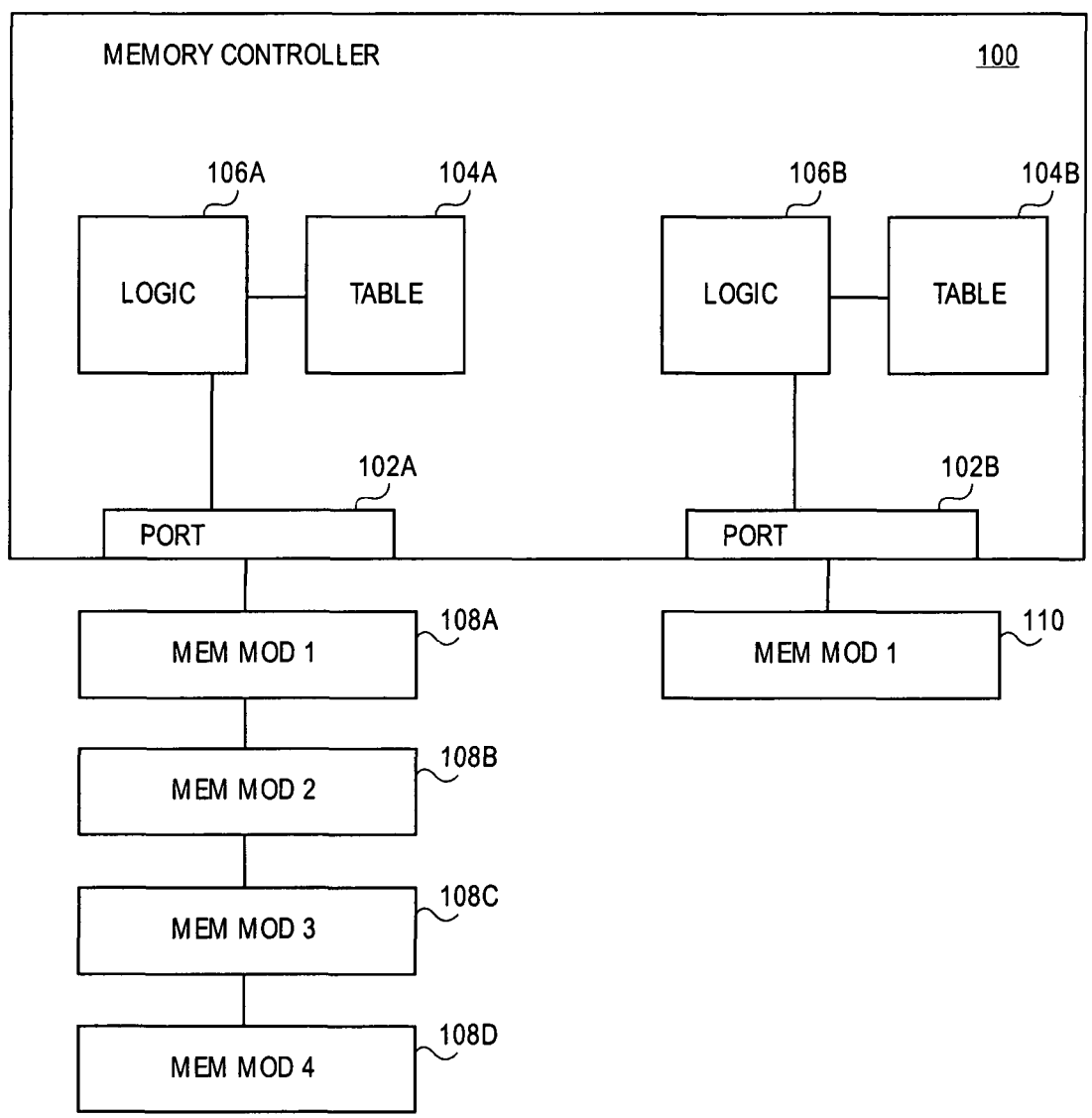
FIG. 1 is diagram of a memory controller having tables corresponding to ports thereof, according to an embodiment of the invention, and is suggested for printing on the first page of the patent.

FIG. 1 shows a memory controller 100, according to an embodiment of the invention. The memory controller 100 includes ports 102A and 102B, collectively referred to as the ports 102, tables 104A and 104B, collectively referred to as the tables 104, and logic 106A and 106B, collectively referred to as the logic 106. Memory modules 108A, 108B, 108C, and 108D, collectively referred to as the memory modules 108, are connected or coupled to the port 102A, whereas memory module 110 is connected or coupled to the port 102B.

The ports 102 are individual communication entities that enable access of the memory modules coupled to them independently of the memory modules coupled to the other ports. Two ports 102 are shown in FIG. 1 for illustrative simplicity. In other embodiments of the invention, more than two ports 102 may be included within the memory controller 100. For instance, in one embodiment, there may be three, four, or more of the ports 102; The memory modules 108 and 110 may each be a single in-line memory module (SIMM), a dual in-line memory module (DIMM), or another type of memory module. Furthermore, whereas there are four memory modules 108 inserted into or attached to the port 102A and one memory module 110 inserted into or attached to the port 102B, such a configuration is one example. In other embodiments, there can be different numbers of memory modules inserted into or attached to either of the ports 102.

The tables 104 correspond to the ports 102, such that the table 104A corresponds to the port 102A and the table 104B corresponds to the port 102B. The tables 104 translate logical memory addresses to physical locations of memory within the memory modules 108 and 110. More specifically, the table 104A maps memory addresses to the memory modules 108, and the table 104B maps memory addresses to the memory module 110. The manner by which the tables 104 translate or map memory addresses to the memory modules 108 and 110 is described in detail later in the detailed description.

The logic 106 employ the tables 104 to determine to which of the memory modules 108 and 110 a received memory access request pertains, and then performs this access. A given memory access request is asserted to both of the logic 106A and 106B in unison, the logic 106A referencing the table 104A relative to the memory modules 108 attached to the port 102A, and the logic 106B referencing the table 104B relative to the memory module 110 attached to the port 102B. That is, there can be up to N simultaneous access to the memory controller 100 at any given point in time, where N is the number of the ports 102. That is to say, multiple simultaneous lookups can be performed to all of the tables 104, and the tables 104 are thus multi-ported.

Only one of the tables 104 maps a memory location within one of the memory modules 108 and 110 for a given memory access request relating to a particular memory address. Therefore, the memory controller 100 asserts the memory access request in unison to all of the logic 106, and the particular logic 106A and 106B that successfully finds a corresponding memory location in one of the memory modules 108 and 110 as mapped thereto within the tables 104 handles processing of the request. The logic 106 may further be considered the entity or component that maintains the tables 104.

As an example, the table 104A may map memory addresses within the memory address sets A, B, and C, and the table 104B may map memory addresses within the memory address sets D and E. A memory request may be a read or a write request relating to a memory address within the memory address set B. The memory request is asserted against both the logic 106A and 106B. The logic 106A successfully finds that its corresponding table 104A maps the memory address of this memory request to a memory location within one of the memory modules 108. By comparison, the logic 106B finds that its corresponding table 104B does not map the memory address of the memory request to a memory location within the memory module 110. Therefore, the logic 106A handles processing of this memory request, and the logic 106B does not.

In FIG. 1, the configuration of the memory modules 108 and 110 relative to the ports 102 is indicative of the type, number, size, order, and position of the memory modules 108 and 110 relative to the ports 102. For example, with respect to the memory modules 108 inserted into the port 102A, each of the memory modules 108 may be of the same or different type, in that each may have the same or different performance characteristics and the like. Each of the modules 108 further may have the same or different size, in that each may have the same or different amount of memory locations. The port 102A may have four slots, or positions, such that the slots are populated with the memory modules 108 in the order depicted in FIG. 1, in which the memory module 108A is in a closest slot to the port 102A, and the memory module 108D is in a farthest slot from the port 102A. By comparison, the port 102B may also have four slots. Although not specifically depicted in FIG. 1, the memory module 110 may be inserted in the third slot, as one example.

FIG. 2 shows the table 104A in detail, according to an embodiment of the invention. The table 104A is illustrated in detail in FIG. 2 as representative of both the table 104A and the table 104B. The table 104A has a number of entries 206A, 206B, 206C, 206D, and 206E, collectively referred to as the entries 206. The entries 206 have a memory address portion 202 and a memory module portion 204. Thus, each of the entries 206 maps memory addresses indicated within its memory address portion 202 to a memory module indicated within the memory module portion 204. Each of the entries 206 maps to no more than one of the memory modules. A memory module may be divided over two or more of the entries 206, which is not specifically shown in FIG. 2, but a single entry does not map to more than one of the modules.

The memory address portion 202 of each of the entries 206 exemplarily includes a number of high bits of a memory address space. The memory address space is the number of bits that is at least as great in number as the number of bits needed to uniquely address each memory location of the memory modules 108 and 1110 of the computer system of which the memory controller 1100 is a part. A particular memory address within the memory address space is a particular specification of those bits. For example, the memory address space may be 26 bits in length. A memory address within that space is any particular specification of these 26 bits, such as 11010000001111111110010101000 as one example.

If the high bits of an entry match the corresponding high bits of the memory address of an incoming memory request, then it is said that the entry in question matches the memory address of the request. The lower bits of the memory address are then used to determine which memory location of the memory module of the matching entry corresponds to this memory address. For example, an incoming memory request may have the memory address 10100000011111110010101000. The highest three bits of this address—101—match the high bits of the entry 206C. Therefore, the memory module specified in the memory module portion 204 of the entry 206C contains the memory location corresponding to this memory address. Furthermore, the lowest remaining bits of the memory address—00000011111110010101000—are used to specify the particular location within this memory module.

The granularity of the memory address portion 202 of each of the entries 206 is dependent on the size of the memory modules 108, the total amount of memory within the system of which the memory controller 100 is a part, and so on. The granularity of the memory address portion 202 in this case means the number of high bits of a memory address that are used to map the memory address to a given memory module. A larger number of high bits used corresponds to greater granularity, and a smaller number of high bits used corresponds to lesser granularity.

The table 104A has several characteristics. First, the entries 206 of the table 104A do not have to be filled in order. For example, as shown in FIG. 2, the entry 206B is empty, whereas the entries 206A, 206C, 206D, and 206E contain mappings from memory addresses to memory modules. Therefore, one of the memory modules 108 can be removed from the port 102A, and the one or more of the entries 206 associated with this memory module can be indicated as empty within the table 104A, without necessarily having to reorder the existing entries to remove empty entries.

Second, the entries 206 of the table 104A do not have to specify the memory modules 108 in the order in which they are connected to the port 102A. For example, as shown in FIG. 1, the memory modules 108A, 108B, 108C, and 108D are connected to the port 102A in order. However, the entries 206A, 206C, 206D, and 206E relate to the memory modules 108A, 108C, 108D, and 108B, respectively. That is, the entries 206A, 206C, 206D, and 206E do not relate to the memory modules 108A, 108B, 108C, and 108D, respectively, which is the order in which they are connected to the port 102A.

Third, the table 104A is independent of the table 104B in its configuration. As a result, the tables 104 support asymmetric population of the memory modules within the ports 102. That is, the number, type, and size of the memory modules 108 connected to the port 102A is not restricted by either the table 104A or the table 104B. The tables 104 can support any type of configuration of the memory modules connected to their associated ports 102. The tables 104 each impose no restrictions as to where the memory modules are to be inserted within their ports 102, both with respect to the number of memory modules inserted in any of the ports 102, and with respect to the position of these memory modules within the ports 102. For example, any of the entries 206 of the table 104 can be specified to relate to any of the memory modules 108.

Fourth, the table 104A is configurable independently of the table 104B. This means that the configuration of the table 104A can be modified independently of the configuration of the table 104B. The configuration of the table 104A includes the number and locations of the entries 206 within the table 104A, as well as the specification of each of the entries 206. So long as changing the configuration of the table 104A does not affect the mappings of the table 104B, the configuration of the table 104A can be changed independently of the table 104B.

For example, the entry 206C specifies that memory addresses having the high bits 101 map to the memory module 108C. If this module is replaced by a first replacement module and a second replacement module, then the entry 206C can be changed so that memory addresses having the high bits 1010 map to the first replacement module, as one example. The entry 206B can then be changed so that memory addresses having the high bits 1011 map to the second replacement module, as one example. Such a change to the table 104A does not affect any of the memory addresses mapped by the table 104B, such that the table 104A can be configured and reconfigured independently of the table 104B.

Reconfiguring of the tables 104 may be accomplished by interaction with software running on the computer system of which the memory controller 100 is a part. For instance, such software may be part of the operating system running on the computer system, or an executive administrator program where more than one operating system is running on the computer system. The memory controller 100 may indicate to this software when changes to the configuration of the memory modules connected thereto has occurred. The software in response may then determine how to reconfigure the tables 104, and provide the memory controller 100 with new entries for the tables 104.

Fifth, the tables 104 are dynamically configurable. This means that the entries of each of the tables 104 are modifiable to reflect changes in the number and/or type of the memory modules of their ports 102, without restarting or temporarily halting the computer system of which the memory controller 100 is a part. In the previous example, for instance, the memory module 108C may be able to be removed, and the two replacement modules may be able to replace the memory module 108C, without having to turn off or temporarily suspend the computer system. In such an instance, the table 104A likewise can be modified without having to restart or temporarily halt the computer system, either. Therefore, the tables 104 support adding, removing, and replacing memory modules without having to first restart or temporarily halt the computer system.

In the table 104A of the embodiment of FIG. 2, there is one memory module portion 204 for the entries 206 of the table 104A. This means that the entries 206 are all read-write entries, and each of the entries 206 is made up of a memory address portion 202 and a memory module portion 204, where the memory module portion 204 is specifically a read-write memory module portion. A read-write entry is an entry that specifies, for a given memory address, which memory module has a memory location corresponding to that address for both read and write purposes. Thus, a memory access request specifying either to read from a given memory address or to write to the given memory address has its read or write performed relative to the same memory location.

Figure 3:
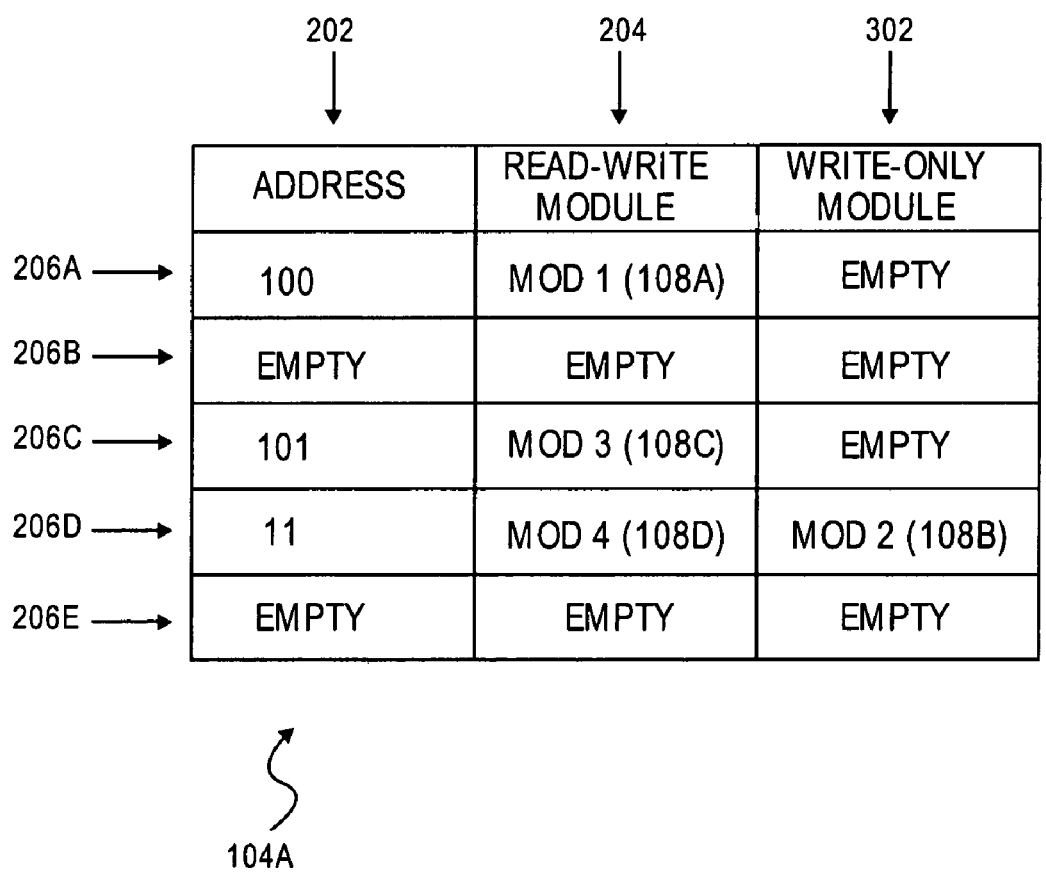
FIG. 3 is a diagram of a table of a memory controller in more detail and which provides for memory module redundancy, according to an embodiment of the invention.

FIG. 3 shows the table 104A, according to another embodiment of the invention, in which the entries 206 include both read-write entries and write-only entries for redundancy or mirroring. An additional write-only memory module portion 302 has been added for the entries 206, in addition to the read-write memory module portion 204. The write-only memory module portion 302 is empty, however, for the entries 206A, 206B, and 206C, such that the entries 206A, 206B, and 206C in the table 104A of the embodiment of FIG. 3 are the same as their corresponding entries in the embodiment of FIG. 2. That is, the entries 206A and 206C are only read-write entries, in that there are only memory modules specified in the portion 204 of these entries. Memory requests relating to memory addresses contained by the address portion 202 of these entries thus map to memory locations within the modules specified in the portion 204 of these entries for both read and write purposes.

By comparison, the entries 206D and 206E are different in the embodiment of FIG. 2 as compared to the embodiment of FIG. 3. The entry 206E has become an empty entry, having no information in any of the portions 202, 204, and 302, like the entry 206B. The memory address portion 202 of the entry 206D of FIG. 3 has in its memory address portion the two high bits 11, which subsumes the three high bits 110 of the entry 206D of FIG. 2 and the three high bits 111 of the entry 206E of FIG. 2. The memory module 108D is specified in the read-write memory module portion 204 of the entry 206D, and the memory module 108B is specified in the write-only memory module portion 302.

Memory access requests having memory addresses with the three high bits 111 are processed as follows. If the memory access request is a read request, then a corresponding memory location within the memory module 108D is read, since the module 108D is specified in the read-write memory module portion 204 of the entry 206D. However, if the memory access request is a write request, then a corresponding memory location within each of the memory module 108D and the memory module 108B is written, since the module 108D is specified in the read-write memory module portion 204 and the module 108B is specified in the write-only memory module portion 302 of the entry 206D.

In other words, read requests relating to memory addresses specified by the memory address portion 202 of the entry 206D are processed only relative to the memory module 108D specified in the read-write memory module portion 204 of the entry 206D. By comparison, write requests relating to memory addresses specified by the memory address portion 202 of the entry 206D are processed relative to both the module 108D specified in the portion 204 and the memory module 108B specified in the write-only memory module portion 302. That is, memory address reads are made from the module 108D, whereas memory address writes are made to both the modules 108D and 108B.

The memory module 108B thus serves as a redundant or mirror memory module to the memory module 108D. The utilization of the write-only memory portion 302 within the entry 206D renders the entry 206D as both a read-write entry of the table 104A and a write-only entry of the table 104A. The entry 206D is considered a read-write entry because it specifies a module within the read-write memory module portion 204, and it is considered a write-only entry, too, because the entry 206D also specifies a module within the write-only memory module portion 302. In one embodiment, the combination of the portion 202 and the portion 204 of the entry 206D may be considered a separate read-write entry, whereas the combination of the portion 202 and the portion 302 of the entry 206D may be considered a separate write-only entry.

The memory module 108D specified in the read-write memory module portion 204 of the entry 206D may be considered the primary memory module for the memory addresses specified by the memory address portion 202 of the entry 206D. This is because both read and write requests are processed relative to the memory module 108D. By comparison, the memory module 108B specified in the write-only memory module portion 302 of the entry 206D may be considered the secondary, backup, mirror, or redundant memory module for the memory addresses specified by the memory address portion 202 of the entry 206D. This is because only write requests, and not read requests, are processed relative to the memory module 108B.

Should the memory module 108D fail and be removed, however, the entry 206D may be modified so as to specify the memory module 108B within the read-write memory module portion 204, and no entry specified within the write-only memory module portion 302. In this case, the memory module 108B effectively becomes the new primary memory module for the memory addresses specified by the memory address portion 202 of the entry 206D. A new-replacement memory module may be added to the port 102A to which the table 104A corresponds, such that this new module may then be indicated within the write-only memory module section 302 of the entry 206D to again provide redundancy and mirroring capability for the memory addresses specified by the portion 202 of the entry 206D.

Figure 4:
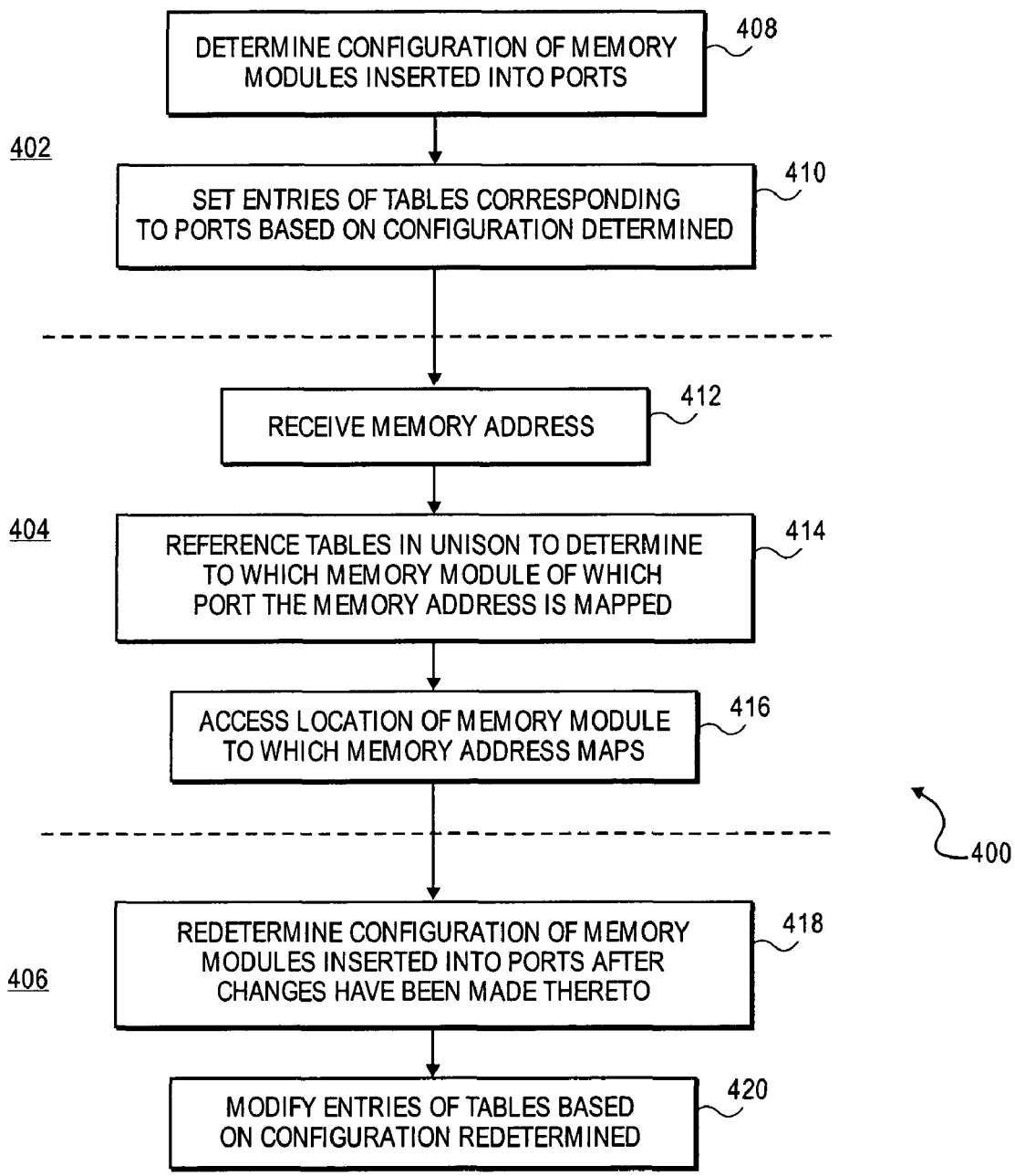
FIG. 4 is a flowchart of a method for maintaining and using the tables of a memory controller that correspond to ports thereof, according to an embodiment of the invention.

FIG. 4 shows a method 400 for maintaining and using the tables 104 that have been described, according to an embodiment of the invention. The method 400 is divided into three parts 402, 404, and 406. The first part 402 is performed when the computer, system of which the memory controller 100 is a part is first started or otherwise booted up. The second part 404 is performed each time a memory request is received by the memory controller 100, such as from a processor of the computer system of which the controller 100 is a part. The third part 406 is performed each time the configuration of the memory modules 108 and 110 attached to the ports 102 of the memory controller 100 changes, requiring corresponding changes in the configuration of the tables 104. The method 400 in one embodiment can be performed by the logic 106 of the controller 100.

In the first part 402, the configuration of the memory modules 108 and 110 inserted into the ports 102 of the memory controller 100 is determined (408). This configuration includes both the number of memory modules inserted into each port, the type of memory modules inserted into each port, and which memory modules are inserted into which slot of each port—i.e., the order of the modules attached to each port. The configuration of the memory modules may be asymmetric, as has been described, for instance. The entries of the tables 104 are then set based on the configuration that has been determined (410). That is, the mappings of memory addresses to memory modules are set based on the configuration, as well as user input or specification indicating how the memory addresses should be mapped to the modules within the confines of the configuration. For example, some memory modules may be primary, read-write modules, whereas other modules may be secondary, write-only modules.

In the second part 404, the memory controller 100 receives a memory address, which may be a part of a memory request pertaining to that address (412). In response, the controller 100, through the logic 106, references the tables 104 in unison to determine to which of the memory modules 108 and 110 of which of the ports 102 the memory address maps and thus corresponds (414). The controller 100 then provides access to the memory location of the memory module to which this memory address maps and corresponds (416), so that reads and writes may be made relative to this memory location. Where more than one memory module corresponds to the memory address, then an access is made to a memory location within each such module as appropriate. For example, a memory address that is part of a write request may be mapped to both a read-write memory module and a write-only memory module, such that a memory location in both of these modules is written to in accordance with the request.

In the third part 406, after changes have been made to the configuration of the memory modules 108 and 110 relative to the ports 102, the configuration is redetermined (418). For example, one or more memory modules may have been added to, removed from, and the like, to either or both of the ports 102. The configuration of the memory modules 108 and 110 relative to the ports 102 thus will have changed. The entries of one or more of the tables 104 are therefore modified based on the new configuration of the memory modules 108 and 110 relative to the ports 102 (420). The third part 406 thus corresponds to the first part 402, such that the first part 402 is initially performed to set the entries of the tables 104, whereas the third part 406 is subsequently performed to modify the entries of the tables 104 when needed.

Finally, FIG. 5 shows a rudimentary system 500, according to an embodiment of the invention. As can be appreciated by those of ordinary skill within the art, the system 500 can include components in addition to and/or in lieu of those depicted in FIG. 5. As shown in FIG. 5, the system 500 includes one or more processors 502, a non-volatile storage 504, the memory controller 100 that has been described, and the memory modules 108 and 110. The processors 502 execute or run computer programs relative to data, either of which may be temporarily stored within the memory modules 108 and 110 and permanently stored in the non-volatile storage 504, as can be appreciated by those of ordinary skill within the art. The non-volatile storage 504 may be a hard disk drive, or another type of non-volatile storage. The processors 502 access the memory modules 108 and 110 through the memory controller 100, as has been described, by issuing read and write requests to the memory controller 100.

It is noted that, although specific embodiments have been illustrated and described herein, it will be appreciated by those of ordinary skill in the art that any arrangement calculated to achieve the same purpose may be substituted for the specific embodiments shown. This application is intended to cover any adaptations or variations of embodiments of the present invention. It is manifestly intended that this invention be limited only by the claims and equivalents thereof.

We claim:

1. A method comprising:
   determining a configuration of a plurality of memory modules inserted into a plurality of ports, including both a number of the memory modules and a type of each memory module inserted into each port;
   setting a plurality of entries of a plurality of tables corresponding to the plurality of ports based on at least the configuration determined, each entry of each table corresponding to no more than one of the memory modules of the table and mapping a subset of memory addresses of the table to one of the memory modules of the table;
   receiving a memory address;
   referencing the tables in unison to determine to which memory module of which port the memory address is mapped, including referencing the entries of the tables; and,
   accessing a location of the memory module to which the memory address maps, and corresponding to the memory address,
   wherein the plurality of tables is equal in number to the plurality of ports,
   wherein the tables comprise a first table and a second table, the entries of the first table being read-write entries, and the entries of the second table being write-only entries, such that the second table is redundant to and mirrors the first table,
   wherein the memory address is received as part of a memory access request, wherein where the memory access request is a read request, then the memory request is processed in relation to the first table, in that a first ent of the first table is used to determine a corresponding memory module that is to be read to satisfy the memory access request,
   wherein where the memory access request is a write request, then the memory request is processed both in relation to the first table and to the second table, in that a first entry of the first table is used to determine a corresponding first memo module that is to be written to satisfy the memory access request and a second entry of the second table is used to determine a corresponding second memory module that is to be written to also satisfy the memory access request.

2. The method of claim 1, further comprising:
   redetermining the configuration of the memory modules inserted into the ports to assess changes made in the configuration; and,
   modifying the entries of the tables based on the changes made in the configuration, without restarting a system of which the memory modules is a part, and such that the entries of each table are modifiable independently of the entries of other of the tables.

3. The method of claim 1, wherein the configuration of the memory modules inserted into the ports is such that a plurality of positions of each port are not populated with memory modules in order.

4. The method of claim 1, wherein the configuration of the memory modules inserted into the ports is asymmetric, such that at least one of the ports has a different number of memory modules inserted thereinto as compared to the ports other than the at least one of the ports.

5. A method comprising:
   determining a configuration of a plurality of memory modules inserted into a plurality of ports, including both a number of the memory modules and a type of each memory module inserted into each port;
   setting a plurality of entries of a plurality of tables corresponding to the plurality of ports based on at least the configuration determined, each entry of each table corresponding to no more than one of the memory modules of the table and mapping a subset of memory addresses of the table to one of the memory modules of the table;
   receiving a memory address;
   referencing the tables in unison to determine to which memory module of which port the memory address is mapped, including referencing the entries of the tables; and,
   accessing a location of the memory module to which the memory address maps, and corresponding to the memory address,
   wherein the configuration of the memory modules inserted into the ports is asymmetric, such that at least one of the ports has a different number of memory modules inserted thereinto as compared to the ports other than the at least one of the ports,
   wherein the plurality of tables is equal in number to the plurality of ports,
   wherein the tables comprise a first table and a second table, the entries of the first table being read-write entries, and the entries of the second table being write-only entries, such that the second table is redundant to and mirrors the first table,
   wherein the memory address is received as part of a memory access request, wherein where the memory access request is a read request, then the memory request is processed in relation to the first table, in that a first ent of the first table is used to determine a corresponding memory module that is to be read to satisfy the memory access request,
   wherein where the memory access request is a write request, then the memory request is processed both in relation to the first table and to the second table, in that a first entry of the first table is used to determine a corresponding first memo module that is to be written to satisfy the memory access request and a second entry of the second table is used to determine a corresponding second memory module that is to be written to also satisfy the memory access request.

* * * * *